R. J. GRUENBERG.
SIDE CURTAIN FOR AUTOMOBILES.
APPLICATION FILED APR. 16, 1919.
1,415,441.
Patented May 9, 1922.
2 SHEETS—SHEET 2.
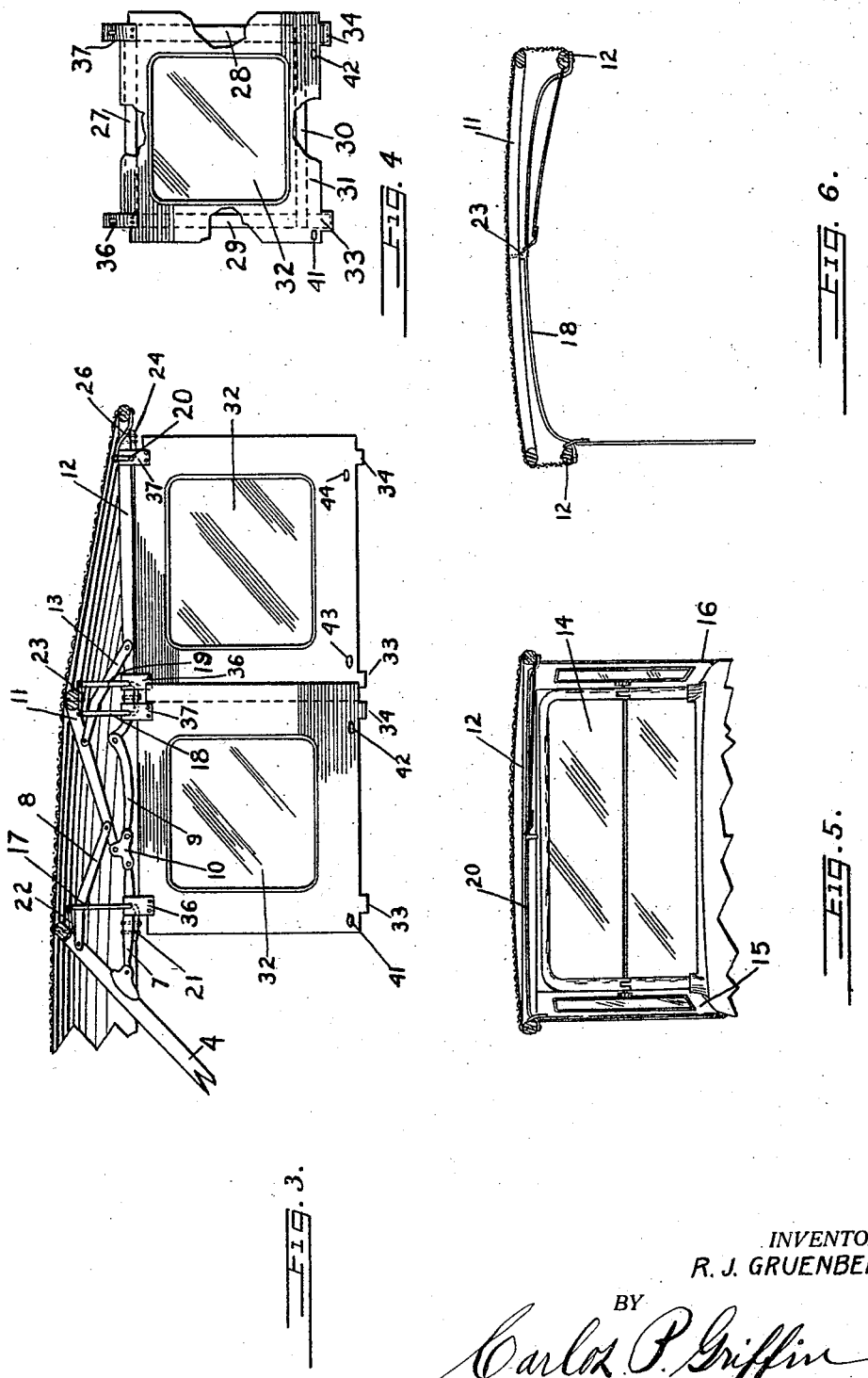
INVENTOR
R. J. GRUENBERG.
BY
Carlos P. Griffin
ATTORNEYS

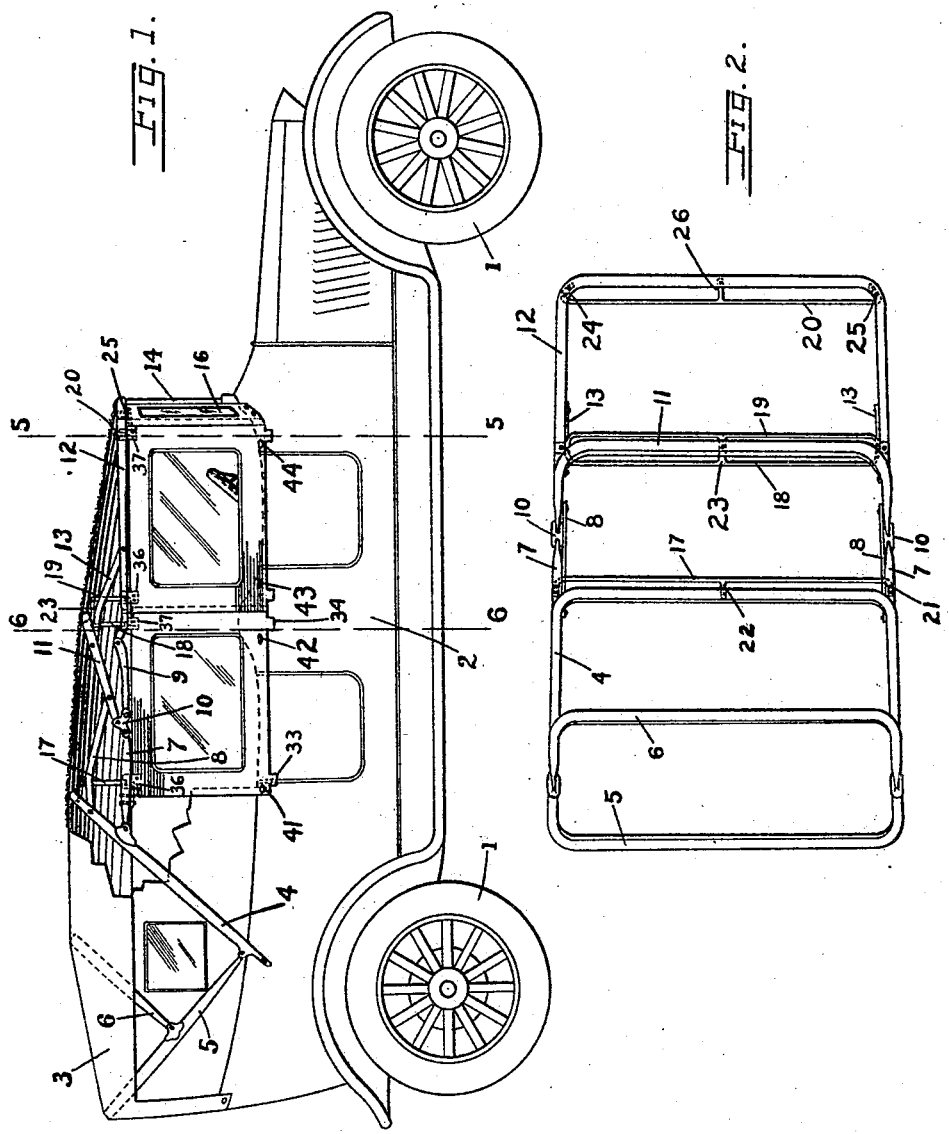

UNITED STATES PATENT OFFICE.

RAOUL J. GRUENBERG, OF SAN FRANCISCO, CALIFORNIA.

SIDE CURTAIN FOR AUTOMOBILES.

1,415,441. Specification of Letters Patent. Patented May 9, 1922.

Application filed April 16, 1919. Serial No. 290,378.

*To all whom it may concern:*

Be it known that I, RAOUL J. GRUENBERG, a citizen of the United States, residing at San Francisco, in the county of San Francisco, State of California, have invented new and useful Side Curtains for Automobiles, of which the following is a specification in such full and clear terms as will enable those skilled in the art to construct and use the same.

This invention relates to a side curtain for automobiles and its object is to produce a side curtain which will be capable of being placed in position for use or concealed under the top at will without stopping the automobile or getting out of the same.

Another object of the invention is to produce a side curtain structure and support therefor which can be assembled in or dismounted from any standard automobile top with the minimum of labor and with practically no change in the top.

Another object of the invention is to provide a curtain which will have a large window opening and which will be so positioned when not in use as to prevent injury to the material, usually some form of celluloid or pyrolin, as takes place when the curtains are stored in such a position as to bend the pyrolin.

Other objects of the invention will appear as the description proceeds.

An embodiment of the invention is shown in the drawings in which the same reference numeral is applied to the same portion throughout, but I am aware that there may be modifications thereof.

In the drawings:

Figure 1 is a side elevation of an automobile with a set of these curtains applied to the top thereof, a portion of the cover material being cut away, Figure 2 is a plan view of the top ribs showing the application thereto of the guides for the support of the curtains herein disclosed, Figure 3 is a sectional view of the automobile top on a larger scale than Figure 1, Figure 4 is a side view of one of the side curtains, Figure 5 is a transverse sectional view of the top looking toward the front of the car, and Figure 6 is a transverse section of the top adjacent the rear curtain supporting rod.

The numeral 1 represents the wheels of the automobile and 2 the body thereof, said body having any suitable form of top 3. In the present instance, a well known folding type of so-called "one man top" is used. This top is provided with a long bow 4, a shorter bow 5 pivoted thereto, the latter having a bow 6 pivoted thereon. The long bow 4 supports a suitable set of links 7, 8, 9, 10 which are in turn connected to the bows 11 and 12, the two latter bows being connected by the link 13. The front of the bow 12 is suitably connected to the windshield 14 all of which is well known in the art and forms no part of the present invention.

Since the wind-shields are usually a little narrower than the body of the car, a curtain with a long narrow window is provided at each end of the windshield as is shown at 15 and 16, said curtain being secured to the top and car body with suitable fasteners.

The present invention comprises four guide rods 17, 18, 19 and 20, which are suitably curved to lie under the top closely adjacent the cover material. The rod 17 is connected at its ends as indicated at 21 to the link 7 which is duplicated on opposite sides of the car, and it is connected by the arm 22 to the center of the top of the bow 4.

The rods 18 and 19 are joined at their ends and connected to the rear ends of the bow 12 on opposite sides of the car. These two rods are joined by a plate 23 at their centers, which plate is connected to the top of the center of the bow 11. The guide rod 20 is connected at 24, 25 to the bow 12 and it has an arm 26 which connects it with the center of the bow 12 over the top of the windshield.

The curtains consist of light rectangular frames made of thin steel plates 27 to 30 inclusive, which plates are covered with a suitable cloth or leather body 31 carrying a window 32. At the bottom, the curtains have tabs 33, 34 reinforced with the lower ends of the plates 28, 29 for the purpose of holding the curtains up, as will be later explained.

At the upper end, each curtain, of which there are two on each side of the car, has an ear as at 36, 37, through which the rods pass, whereby the curtains are supported.

It will be observed in Figures 5 and 6, that the outer ends of the curtain supporting rods are sharply down turned, the object being to hold the curtains out when once they have been swung into that position. It is also to be noted that the curtains are actually wider than the frame on which they are formed, the object being to provide a flexible edge for each curtain which will overlap the adjacent curtains and which will be easier to manipulate than if the curtain was rigid for its full width.

The curtains are of such length that the ends of the bars 28, 29 will touch the side bows, note the right sides of Figures 5 and 6, with sufficient friction to hold the curtains up when they have been once placed in that position.

The curtains are fastened down by means of suitable buttons 41 to 44 inclusive.

This structure provides transverse guide rods, the rods 17 to 20, connected to the longitudinal side rails, the members 7 and 12, of the top, abutment elements, the arm 32 and the plate 23, associated with the rods, curtains slidable on the rods from a substantially horizontal position beneath the top to a vertical position depending from the side rails, the curtains in horizontal position engaging the abutment elements and the horizontal side rails, said abutment elements being spaced from said side rails a distance less than the length of the relatively stiff flexible side curtains so that said curtains must be flexed to wedgingly engage the side rails and be frictionally maintained in engagement therewith by the inherent tension of the curtains. By the term "inherent tension of the curtains" I refer to the spring tension of the curtain, as a unit, which tends to maintain it in a flat condition, and by which it grips the surface of the longitudinal rail when wedged upwardly between the rail and the inner abutment elements. The retaining of the curtains in upper position by this wedging action obviates the necessity of any latches or retaining means of other character.

Having thus described my invention, what I claim as new and desire to secure by Letters Patent of the United States is as follows, express reservation being made of permissible modifications:

1. The combination including an automobile top having longitudinal side rails and a plurality of transverse guides, abutment elements associated with said guides, and relatively stiff flexible side curtains slidably supported by the guides and adapted to have their lower edges brought against the side rails and their upper portion brought against the abutments to be frictionally maintained against displacement by their inherent tension.

2. The combination including an automobile top having longitudinal side rails and a plurality of transverse guide rods, abutment elements associated with said rods, and relatively stiff flexible side curtains slidable on the rods from a substantially horizontal position beneath the top roof to a vertical position depending below the side rails, said curtains being adapted to be flexed to engage their upper portion with the abutments and their lower portion with the side rails, with their inherent tension functioning to frictionally maintain said curtains against displacement.

3. The combination including an automobile top having longitudinal side rails and a plurality of transverse guide rods, abutment elements associated with said rods, and relatively stiff flexible side curtains having ears through which the rods project, the curtains being adapted to slide on the rods from a substantially horizontal position beneath the top roof to a vertical position depending below the side rails, the curtains being adapted to be flexed and wedged between the abutments and side rails with their lower edges frictionally gripping the side rails.

4. The combination including an automobile top having longitudinal side rails and intermediate abutment elements transversely spaced therefrom, and relatively stiff flexible side curtains slidable on the top from a substantially horizontal position beneath the top roof to a vertical position depending from the side rails, the curtains having an inherent straightening tension adapting them to be flexed to wedge their upper portions against the abutments and their lower edges against the side rails to frictionally maintain them against displacement.

5. The combination including an automobile top having longitudinal side rails and intermediate abutment elements transversely spaced a fixed distance therefrom, and relatively stiff flexible side curtains longer than said fixed distance and having an inherent tension tending to maintain them in flat condition, whereby, said curtains may be flexed into wedging engagement with the rails and abutments with their inherent tension maintaining them against displacement.

6. The combination including an automobile top having longitudinal side rails, transverse guides fixed on the top below its roof, abutment elements associated with the guides and spaced a fixed distance from the rails, and relatively stiff flexible side curtains longer than said fixed distance and having an inherent straightening tension, the curtains being slidable on the guides, from a vertical position depending from the side rails to a substantially horizontal position beneath the top roof and then flexed to frictionally wedge between the abutments and side rails.

7. A side curtain for automobiles comprising an automobile top having supporting bows with side rails, a plurality of transverse guides associated with the top, curtains having means at their upper edges to connect with said guides, the lower edges of the curtains being adapted to frictionally engage the side rails of the top when not in use.

In testimony whereof I have hereunto set my hand this 9th day of April A. D. 1919.

RAOUL J. GRUENBERG.